US006994504B2

(12) United States Patent
Gordon

(10) Patent No.: US 6,994,504 B2
(45) Date of Patent: *Feb. 7, 2006

(54) TWO PART SLIDE FASTENER

(75) Inventor: Gary G. Gordon, Novi, MI (US)

(73) Assignee: TRW Automotive U.S., Farmington Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/603,032

(22) Filed: Jun. 24, 2003

(65) Prior Publication Data

US 2004/0265094 A1    Dec. 30, 2004

(51) Int. Cl.
F16B 13/04    (2006.01)
F16B 13/06    (2006.01)

(52) U.S. Cl. ............... 411/508; 411/45; 411/509; 411/913

(58) Field of Classification Search ........... 411/508, 411/509, 510, 913, 45, 41, 46, 48; 24/297, 24/453
See application file for complete search history.

(56) References Cited

U.S. PATENT DOCUMENTS

| | | | | | |
|---|---|---|---|---|---|
| 4,276,806 | A | * | 7/1981 | Morel ............. | 411/41 |
| 4,391,559 | A | * | 7/1983 | Mizusawa ......... | 411/45 |
| 5,134,923 | A | * | 8/1992 | Wexler ............ | 92/31 |
| 5,163,796 | A | * | 11/1992 | Belser ............ | 411/342 |
| 5,211,519 | A | * | 5/1993 | Saito ............. | 411/45 |
| 5,507,545 | A | * | 4/1996 | Krysiak .......... | 296/97.9 |
| 5,636,937 | A | * | 6/1997 | Zemlicka ......... | 403/388 |
| 5,732,916 | A | * | 3/1998 | Gordon ........... | 248/220.41 |
| 5,850,676 | A | * | 12/1998 | Takahashi et al. .. | 24/297 |
| 5,899,910 | A | * | 5/1999 | Etman ............ | 606/133 |
| 6,007,285 | A | | 12/1999 | Sisto et al. | |
| 6,176,660 | B1 | * | 1/2001 | Lewis et al. ...... | 411/45 |
| 6,196,756 | B1 | * | 3/2001 | Leverger ......... | 403/326 |
| 6,406,242 | B1 | * | 6/2002 | Gordon ........... | 411/508 |
| 6,474,921 | B1 | * | 11/2002 | Gordon ........... | 411/508 |
| 6,652,206 | B2 | * | 11/2003 | Heflin et al. ..... | 411/48 |
| 2002/0176762 | A1 | * | 11/2002 | Moerke ........... | 411/45 |
| 2004/0016088 | A1 | * | 1/2004 | Angellotti ........ | 24/297 |

(Continued)

FOREIGN PATENT DOCUMENTS

JP        11025803 A   *   1/1999

OTHER PUBLICATIONS

Nayler, "Dictionary of Mechanical Engineering", 1997, Society of Automotive Engineers, Inc., 4th edition, p. 58, cover and title page.*

(Continued)

Primary Examiner—Katherine Mitchell
(74) Attorney, Agent, or Firm—Tarolli, Sundheim, Covell & Tummino L.L.P.

(57) ABSTRACT

A two part fastener (10) for clamping together first and second members (20, 22) that have an opening (40), comprises a base (12) having legs (80, 90) resiliently biased outwardly away from each other and insertable through the opening (40). A slide (14) is manually slidable relative to the base (12) to control the position of the legs (80, 90). The slide (14) has a first position relative to the base (12) in which blocking portions (88, 98) of the legs (80, 90) are in a blocking position to block removal of the legs through the opening (40). In a second position the slide (14) blocks inward movement of the legs (80, 90) thereby blocking removal of the fastener (10). In a third position the slide (14) holds the legs (80, 90) inward, thereby enabling removal of the fastener (10).

12 Claims, 5 Drawing Sheets

U.S. PATENT DOCUMENTS

2004/0020016 A1* 2/2004 Yoneoka .................. 24/297

OTHER PUBLICATIONS

U.S. Appl. No. 09/907,346, filed Jul. 17, 2001 entitled Two part Twist Fastener.

TRW Fasteners—Arrowhead for a slot, Jun. 1996.

TRW United Carr—Fastener, 1983.

U.S. Appl. No. 09/907,346, filed Jul. 17, 2001 entitled Two Part Twist Fastener.

* cited by examiner

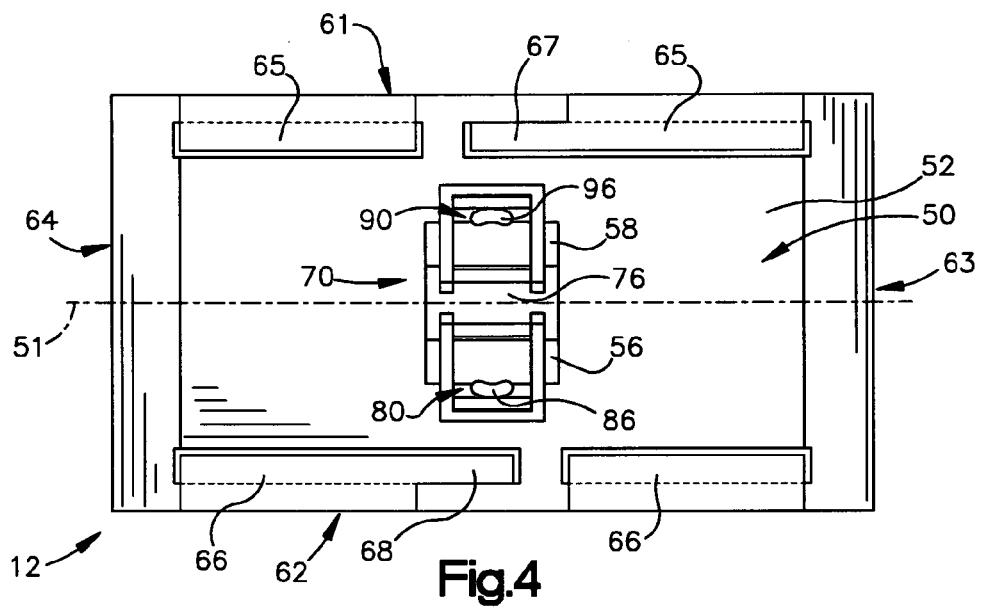
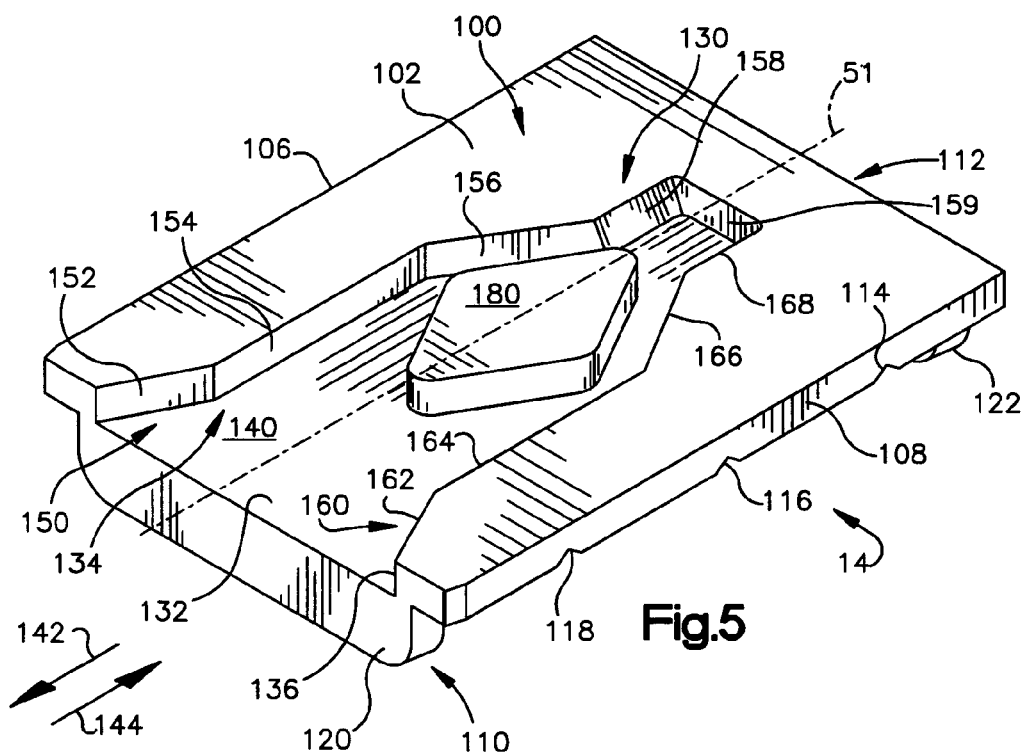

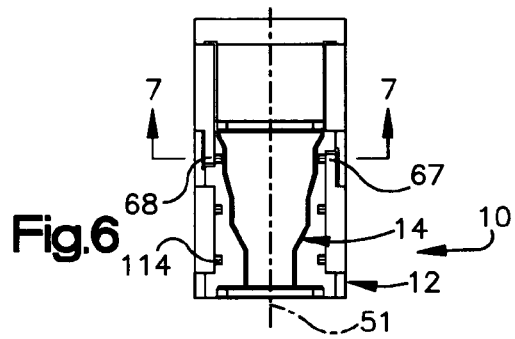
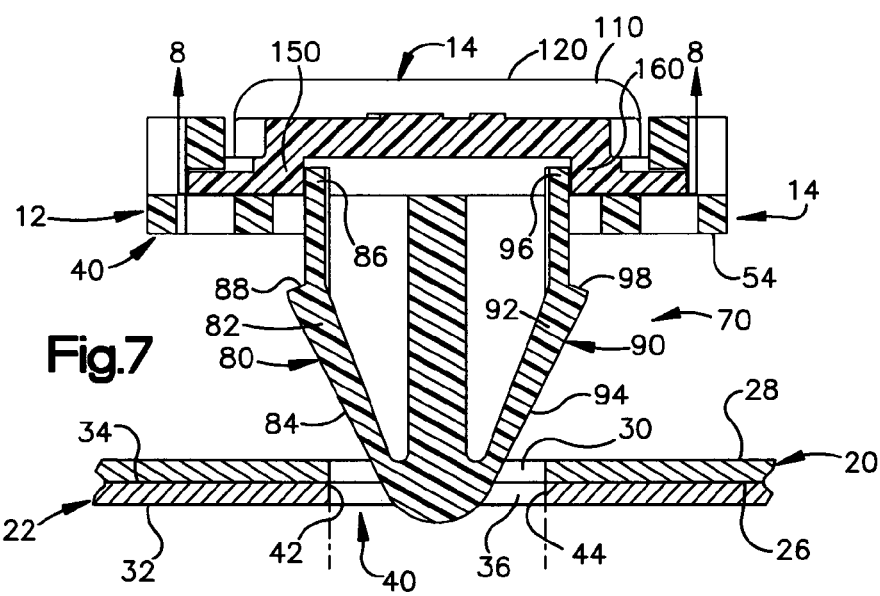
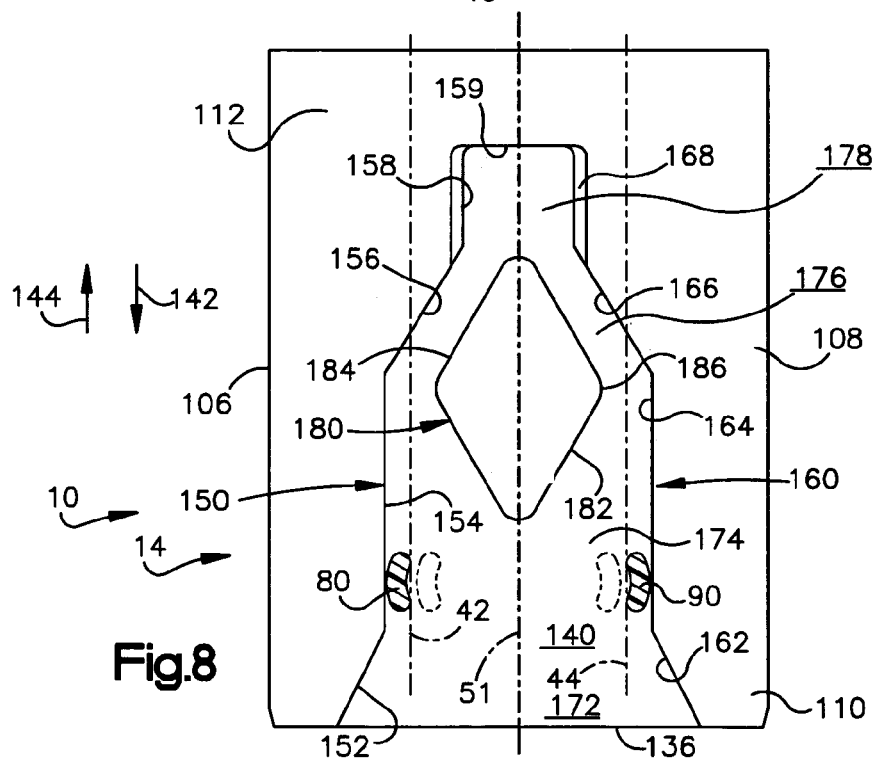

TWO PART SLIDE FASTENER

BACKGROUND OF THE INVENTION

1. Technical Field

The present invention relates to a two part slide fastener for releasably securing a first member to a second member.

2. Description of the Prior Art

In many applications it is necessary to fasten together two members, such as panels or plates, in a releasable manner. For example, a vehicle door typically includes at least two panels that must be fastened securely together, but must also be removable from each other. Many different types of releasable fasteners have been developed for this type of application.

SUMMARY OF THE INVENTION

The present invention is a two part fastener for clamping together first and second members in an overlying relationship, the first and second members having surfaces defining an opening extending through the first and second members. The fastener comprises a base insertable into the opening. The base has a plurality of legs resiliently biased outwardly away from each other and movable between a plurality of positions relative to the first and second members, the legs being insertable through the opening. The fastener comprises an actuator connected with the base and manually slidable along a linear axis relative to the base to control the position of the legs of the base relative to the first and second members. The actuator has a first position of sliding movement relative to the base in which blocking portions of the legs are in a blocking position to block removal of the legs through the opening. The actuator has a second position of sliding movement relative to the base in which the actuator blocks inward movement of the blocking portions of the legs from the blocking position, thereby blocking removal of the fastener through the opening. The actuator has a third position of sliding movement relative to the base in which the actuator holds the blocking portions of the legs inward from the blocking position, thereby enabling removal of the fastener from the first and second members through the opening.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 4 is a top plan view of a base that forms part of the fastener of FIG. 1;

FIG. 5 is a bottom perspective view of a slide that forms part of the fastener of FIG. 1;

FIG. 6 is a top plan view of the fastener of FIG. 1, showing the fastener in a first condition for insertion into an opening of members to be fastened together;

FIG. 7 is a sectional view taken generally along line 7—7 of FIG. 1 showing parts of the fastener in the first condition;

FIG. 8 is a bottom plan view of portions of the fastener of FIG. 1, showing the parts of the fastener in the first condition;

DETAILED DESCRIPTION OF THE INVENTION

Figure 1:
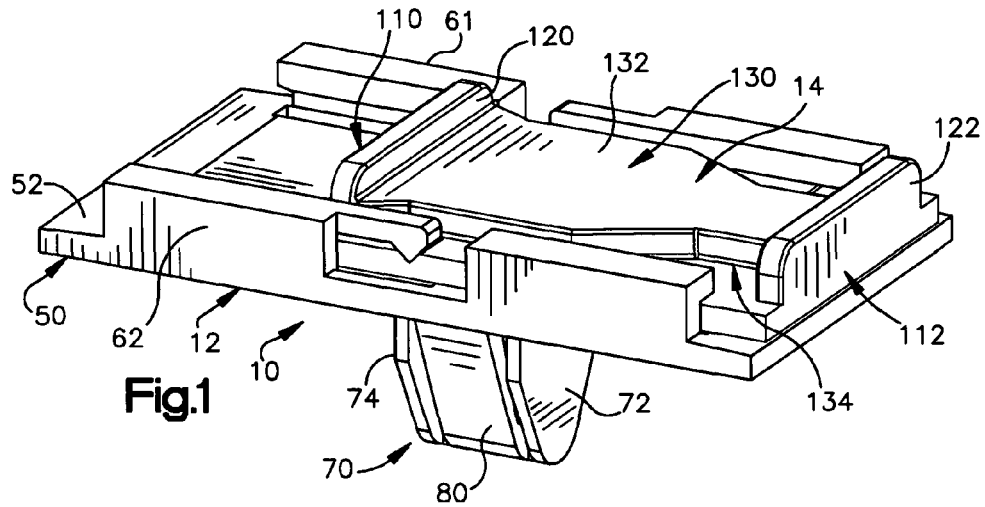
FIG. 1 is a top perspective view of a fastener in accordance with the invention.

The present invention relates to a two part fastener for releasably securing a first member to a second member. The present invention is applicable to different fastener constructions. As representative of the present invention, FIG. 1 illustrates a two-part fastener 10 in accordance with the invention. The fastener includes a base 12 and a slide 14.

The fastener is used for releasably securing together two or more members in an overlying relationship. In the illustrated embodiment, the fastener is used for releasably securing together a first member 20 (FIG. 7) and a second member 22. The first and second members 20 and 22 may be, for example, portions of a vehicle door, such as a support panel and a trim panel, or may be two plates or other pieces.

The first member 20 (FIG. 7) has opposite inner (that is, away from the side of entry of the fastener, or to the bottom as viewed in FIG. 7) and outer major side surfaces 26 and 28. The first member 20 has a rectangular slot 30 extending between the inner and outer major side surfaces 26 and 28. The second member 22 has opposite inner and outer major side surfaces 32 and 34. The outer major side surface 34 of the second member 22 is in abutting engagement with the inner major side surface 26 of the first member 20.

The second member 22 (FIG. 4) has a rectangular slot 36 extending between the inner and outer major side surfaces 32 and 34. The slot 36 in the second member 22 may be similar or identical in configuration to the slot 30 in the first member. The slot 36 in the second member 22 overlies the slot 30 in the first member 20 and together they form an opening 40 in the two members 20 and 22. The opening 40 has a length extending between first and second edge surfaces 42 and 44. The fastener 10 extends into the opening 40, in a manner described below, to clamp the first member 20 to the second member 22.

Figure 2:
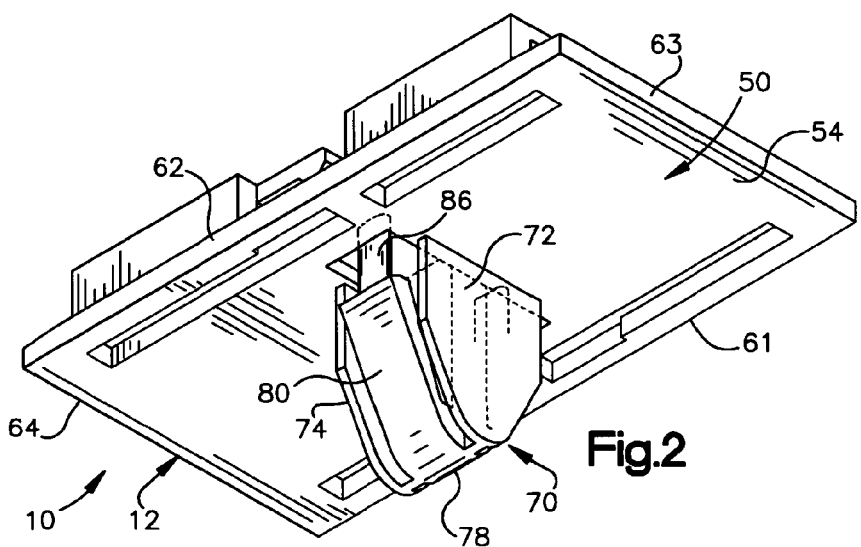
FIG. 2 is a bottom perspective view of the fastener of FIG. 1.
Figure 3:
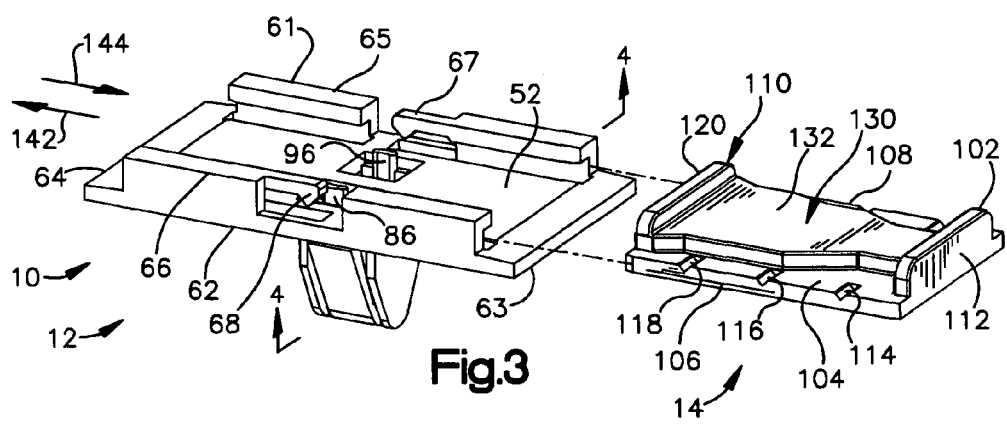
FIG. 3 is an exploded perspective view of the fastener of FIG. 1.

The base 12 (FIGS. 1 and 2) of the fastener 10 is preferably molded as one piece from a plastic material, but could alternatively be made from a different material or in a different manner. The base 12 includes a planar, rectangular main body portion 50 centered on a linear axis 51. The main body portion 50 has an outer major side surface 52 (FIG. 2) and an inner major side surface 54. The main body portion 50 also has two rectangular openings 56 and 58 spaced apart from each other.

The main body portion has parallel first and second side portions 61 and 62, and parallel first and second end portions 63 and 64. At the side portions 61 and 62 are located inwardly facing tracks 65 and 66, respectively, that project upwardly from the outer side surface of the main body portion. A detent finger 67 is formed on the track 65, and a detent finger 68 is formed on the track 66.

The arrangement of the tracks 65 and 66, and of the detent fingers 67 and 68, is such that the base 12 appears the same when viewed from the first end portion 63 as when viewed from the second end portion 64. Thus, the slide 14 can be mounted on the base 12, as described below, from either end portion 63 or 64 of the base.

The base 12 includes a retainer assembly 70 that depends from the main body portion 50 and that is movable into the opening 40 in the first and second members 20 and 22, as described below. The retainer assembly 70 includes two guide plates 72 and 74 that depend from the main body portion 50 on opposite sides of the two openings 56 and 58. The retainer assembly 70 also includes a central support post 76 that depends from the main body portion 50 between the two openings 56 and 58. The support post 76 has a rectangular cross-sectional configuration terminating in a lower end portion 78 that is curved for ease of insertion into the slot opening 40.

The retainer assembly 70 further includes two engagement members 80 and 90 for engaging the inner side surface 26 of the first member 20. The two engagement members 80 and 90 are formed as resilient retaining legs that extend from the lower end portion 78 of the central support post 76, in a direction toward the main body portion 50 of the base 12. The two retaining legs 80 and 90 are mirror images of each other, and are resiliently biased outward, away from each other.

The first retaining leg 80 is resiliently supported on the central support post 76. The first retaining leg 80 has a base portion 82 (FIG. 7) that has a cam surface 84 that faces outward away from the support post 76. The first retaining leg 80 has an upper end portion 86 that extends upward from the base portion 82. The upper end portion 86 extends past the plane of the main body portion 50 and through the opening 56 in the main body portion. The upper end portion 86 has a kidney-shaped cross-sectional configuration (FIG. 4).

The first retaining leg 80 also has a blocking portion or blocking surface 88 (FIG. 7) that extends between the upper end portion 86 and the cam surface 84 of the base portion 82. The blocking surface 88 faces outward, that is, away from the central support post 76.

The second retaining leg 90 is a mirror image of the first retaining leg 80. The second retaining leg 90 is resiliently supported on the central support post 76. The second retaining leg 90 has a base portion 92 (FIG. 7) that has a cam surface 94 that faces outward away from the support post 76.

The second retaining leg 90 has an upper end portion 96 that extends upward from the base portion 92. The upper end portion 96 extends past the plane of the main body portion 50 and through the opening 58 in the main body portion. The upper end portion 96 has a kidney-shaped cross-sectional configuration.

The second retaining leg 90 also has a blocking portion or blocking surface 98 that extends between the upper end portion 96 and the cam surface 94 of the base portion 92. The blocking surface 98 faces outward, that is, away from the central support post 76.

The slide 14 (FIGS. 1 and 2) is preferably molded as one piece from the same plastic material as the base 12, but could alternatively be made from a different material or in a different manner. The slide 14 includes a planar, rectangular main body portion 100 having opposite inner and outer major side surfaces 102 and 104. The main body portion 100 of the slide 14 has parallel first and second side portions 106 and 108, and parallel first and second end portions 110 and 112. Three pairs of detent openings 114, 116 and 118 are formed in the outer side surface 104 of the slide 100, near the side portions 106 and 108.

Two rib-shaped finger grips 120 and 122 project from the outer side surface 104 at the end portions 110 and 112, respectively, of the slide 14. The finger grips 120 and 122 are manually engageable to effect sliding movement of the slide 14 along the axis 51 relative to the base 12. The finger grips 120 and 122 do not extend the full width of the slide 14. As a result, the side portions 106 and 108 of the slide 14 project laterally outward from the finger grips 120 and 122.

The slide 14 has a raised portion 130. The raised portion 130 projects from the outer side surface 104 of the main body portion 100 of the slide 14. The raised portion 130 includes a top wall 132 that is spaced upward from and extends parallel to the main body portion 100. The raised portion 130 also includes a support wall 134 that extends between the top wall 132 and the main body portion 100 of the slide 14. The support wall 134 supports the top wall 132 on the main body portion 100.

The main body portion 100 is discontinuous at the location of the raised portion 130. Thus, the slide 14 is configured as if a section of the main body portion 100 were lifted upward to form the top wall 132 of the raised portion, then the support wall 134 was placed between them to support the top wall on the main body portion.

The raised portion 130 has a roughly V-shaped configuration that decreases in width as measured in a direction from the first end portion 106 to the second end portion 108 of the slid 14. The raised portion 130 extends to and between the finger grips 120 and 122.

At the first end portion 110 of the slide 14, the main body portion 100 of the slide is cut away to provide an access opening 136 that is the width of the raised portion 130. The access opening 136 enables access to a chamber 140 that is defined below the top wall 132 of the raised portion 130 and above the main body portion 100, within the support wall 134 of the raised portion. Thus, the first end portion 110 of the slide 14 is effectively open to the chamber 140. The finger grip 122 at the second end portion 112 of the slide closes the chamber 140 and forms an end wall of the chamber.

A first direction of movement 142 of the slide 14 is defined as movement of the slide along the axis 51 by which the first end portion 110 of the slide precedes the second end portion 112 of the slide-that is, with the open end of the chamber 140 leading and the closed end trailing. The inside surfaces of the support wall 134 of the raised portion 130 of the slide 14 are engageable with the upper end portions 86 and 96 of the first and second retaining legs 80 and 90. Specifically, the support wall includes first and second tracks 150 and 160. The tracks 150 and 160 extend from the access opening 136 to the finger grip 122. The tracks 150 and 160 are mirror images of each other about the axis 51.

Because of the V-shaped configuration of the raised portion 130 of the slide 14, the tracks 150 and 160 converge as they extend away from the access opening 136. The chamber 140, located between the tracks 150 and 160, tapers (decreases in width) from the first end portion 110 of the slide 14 to the second end portion 112 of the slide.

The first track 150 has four discrete, interconnected surfaces. The first surface 152 extends inward toward the axis 51 as it extends in a direction from the open first end portion 110 of the slide 14 to the closed second end portion 112. The second surface 154 extends from the first surface 152, in a direction parallel to the axis 51.

The third surface 156 extends from the second surface inward toward the axis 51 as it extends in a direction from the open first end portion 110 of the slide 14 to the closed second end portion 112. The fourth surface 158 extends from the third surface 156, in a direction parallel to the axis 51. The fourth surface 158 terminates in an end surface 159 of the support wall 134.

The second track 160 is a mirror image of the first track 150. The second side wall has four discrete, interconnected surfaces. The first surface 162 extends inward toward the axis 51 as it extends in a direction from the open first end portion 110 of the slide 14 to the closed second end portion 112. The first surface 162 is located opposite the first surface 152 of the first track 150. The second surface 164 extends from the first surface 162, in a direction parallel to the axis 51. The second surface 164 is located opposite the second surface 154 of the first track 150.

The third surface 166 extends inward toward the axis 51 as it extends in a direction from the open first end portion 112 of the slide 14 to the closed second end portion 112. The third surface 166 is located opposite the third surface 156 of the first track 150.

The fourth surface 168 extends from the third surface 166, in a direction parallel to the axis 51. The fourth surface 168 terminates in the end surface 159 of the support wall 134. The fourth surface 168 is located opposite the fourth surface 158 of the first track 150.

The pairs of opposite surfaces on the first and second tracks 150 and 160 define portions of the chamber 140. A first portion 172 of the chamber 140 is defined between the first surfaces 152 and 162. A second portion 174 of the chamber 140 is defined between the second surfaces 154 and 164. A third portion 176 of the chamber 140 is defined between the third surfaces 156 and 166. A fourth portion 178 of the chamber 140 is defined between the fourth surfaces 158 and 168.

The slide 14 includes a stop 180 on the inner major side surface 102 of the main body portion 110. The stop 180 is a diamond-shaped projection centered on the axis 51 and projecting into the chamber 140, specifically, into the second and third portions 174 and 176 of the chamber. The stop 180 has two side surfaces 182 facing toward the open first end portion 110 end of the slide 14, and two side surfaces 184 facing toward the closed second end portion 12 of the slide. The slide 14 has two points 186 at its widest portion, located inward of the second surfaces 154 and 156 of the tracks 150 and 160, respectively.

The fastener 10 is assembled by sliding the slide 14 onto the base 12. The first end portion 110 of the slide 14 is moved axially into the space between the tracks 65 and 66 of the base 12. The edge portions 106 and 108 of the slide 14 fit under the tracks 66 and 65, respectively. The first finger grip 120 extends laterally between the tracks 65 and 66. The main body portion 100 of the slide 14 overlies the main body portion 50 of the base 12. The slide 14 is supported on the base 12 for linear sliding movement relative to the base along the axis 51.

As the slide 14 moves along the base 12, the end portions 86 and 96 of the retaining legs 80 and 90 of the base engage the first sections 152 and 162 of the tracks 150 and 160, and are cammed inward toward the axis 51. The slide 14 is moved axially in the first direction 142 until the pair of detent fingers 67 and 68 on the base 12 engage in the pair of first detent openings 118 in the base. In this position, the retaining legs 80 and 90 are self-biased outwardly against the second sections 154 and 164 of the slide tracks 150 and 160.

When the slide 14 is thus assembled on the base 12, and prior to insertion of the fastener 10 into the opening 40, the parts of the fastener are in an assembled or as-molded condition shown in FIG. 7 and in solid lines in FIG. 8. The first retaining leg 80 is biased outwardly and engages the second section 154 of the first track 150. The second retaining leg 90 is biased outwardly and engages the second section 164 of the second track 160.

When the fastener 10 is thereafter inserted into the opening 40 in the first and second members 20 and 22, the parts of the fastener assume a first condition, or insertion condition. In the first condition, the parts of the fastener 10 are in substantially the same position as in the assembled condition shown in FIG. 7 and in solid lines in FIG. 8, with the exception that the retaining legs 80 and 90 move inwardly, away from the tracks 150 and 160, into the position shown in dashed lines in FIG. 8.

Specifically, as the retainer assembly 70 of the fastener 10 is inserted into the opening 40 (shown in dashed lines in FIG. 8), the cam surfaces 84 and 94 on the retaining legs 80 and 90, respectively, engage the edge surfaces 42 and 44 of the opening 40, and cam the retaining legs inward from their as-molded condition, toward the axis 51. The fastener 10 moves into the opening 40 until the inner side surface 54 of the main body portion 50 of the base 12 engages the outer side surface 28 of the first member 20, as shown in FIG. 7, to limit movement of the fastener in a direction into the opening.

During this movement, the retainer assembly 70 moves far enough into the opening 40 that the blocking surfaces 88 and 98 move past the edge surfaces 42 and 44. The retaining legs 80 and 90 spring back outward, away from the axis 51. The retaining legs 80 and 90 move outward until the end portions 86 and 96 of the retaining legs engage the edge surfaces 42 and 44 of the opening 40. The edge surfaces 42 and 44 of the opening 40 resist further lateral movement of the retaining legs 80 and 90. The blocking surface 88 on the first retaining leg 80 and the blocking surface 98 on the second retaining leg 90 engage the inner major side surface 32 of the second member 22. This engagement blocks or resists removal of the base 12 from the opening 40.

The blocking portions 88 and 98 of the legs 80 and 90 are thus in a blocking position to block removal of the legs through the opening 40. The retaining legs 80 and 90 can, however, be bent inward to enable removal of the fastener 10 from the opening 40, if sufficient axial force is placed on the fastener. Therefore, the fastener 10 is not locked, and the members 20 and 22 are not securely clamped together.

To move the fastener 10 from the first condition to a second or locking condition (FIGS. 9–11), the slide 14 is moved (slid) relative to the base 12 in the first direction 142. When force is placed on the finger grips 120 and 122 of the slide 14, the slide slides relative to the base 12, in a direction along the axis 51, but the base does not move in the opening 40 because of the engagement of the retaining legs 80 and 90 in the opening. The slide 14 is moved axially in the first direction 142 until the pair of detent fingers 67 and 68 on the base 12 engage in the pair of second detent openings 116 in the slide 14.

Figure 11:
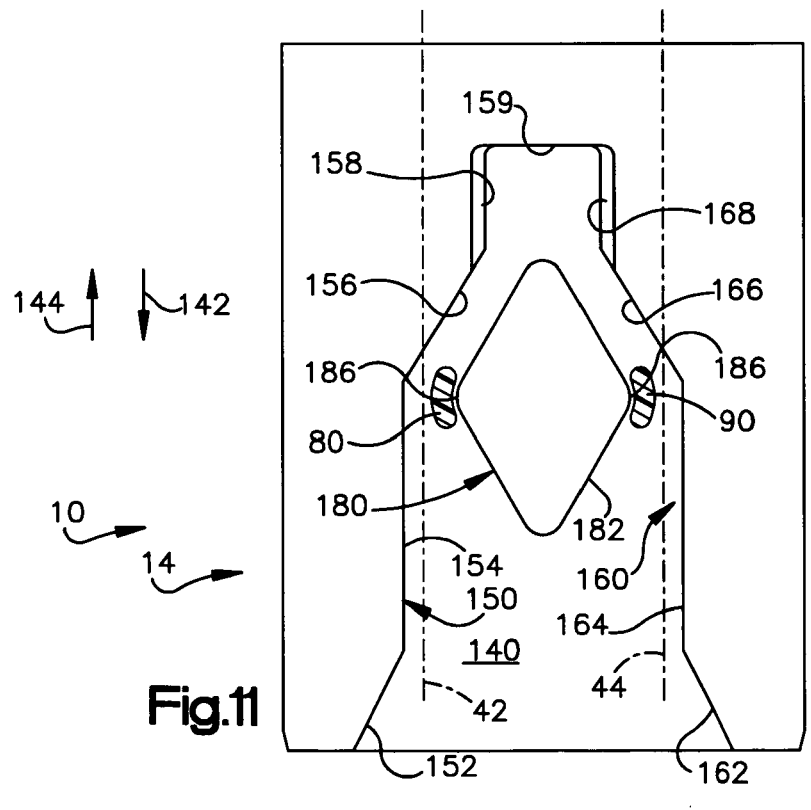
FIG. 11 is a bottom plan view of portions of the fastener of FIG. 1, showing the parts of the fastener in the second condition.

As the slide 14 moves relative to the base 12, the first and second tracks 150 and 160 of the slide move relative to the retaining legs 80 and 90 of the base, in the first direction 142 as viewed in FIGS. 8 and 11, from the position shown in solid lines in FIG. 8 toward the position shown in FIG. 11. When the slide 14 reaches the position shown in FIG. 11, the corner surface 186 on the stop 180 of the slide 14 engages the inside of the first retaining leg 80. In this position of the parts, the stop 180 blocks inward movement of the first retaining leg 80, while the edge surface 42 of the opening 40 blocks outward movement of the end portion 86 of the first retaining leg. Thus, the first retaining leg 80 is clamped between the stop 180 and the edge 42 of the opening 140, and can not move either inward or outward relative to the axis 51.

Simultaneously, the stop 180 engages the inside of the second retaining leg 90. In this position of the parts, the corner 186 of the stop 180 blocks inward movement of the second retaining leg 90, while the edge surface 44 of the opening 40 blocks outward movement of the end portion 96 of the second retaining leg 90. Thus, the second retaining leg 90 is clamped between the stop 180 and the edge 44 of the opening 40, and can not move either inward or outward relative to the axis 51.

Figure 9:
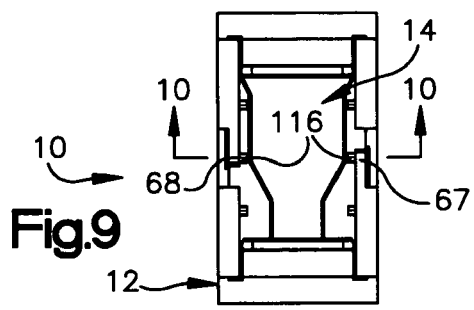
FIG. 9 is a top plan view of the fastener of FIG. 1, similar to FIG. 6, showing the fastener in a second or locking condition.
Figure 10:
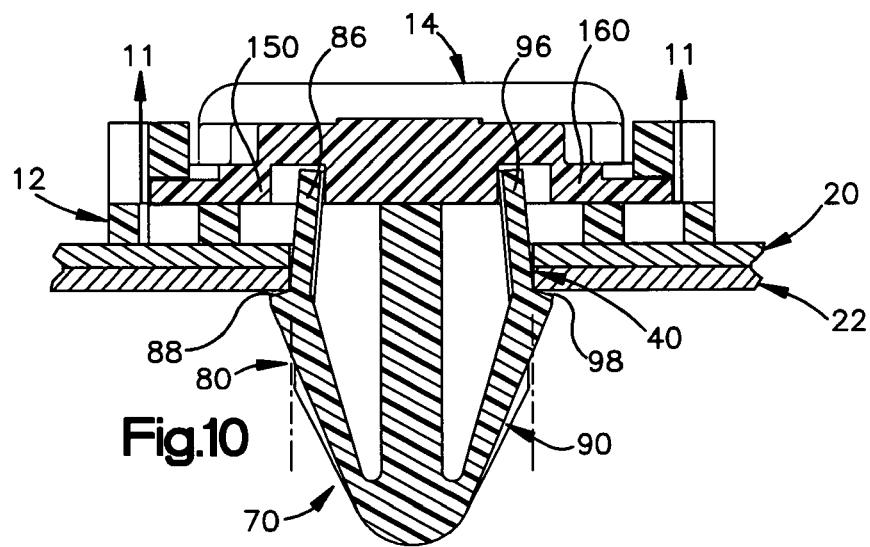
FIG. 10 is a sectional view taken generally along line 10—10 of FIG. 9, showing the parts of the fastener in the second condition.

When the fastener 10 is in the second or locked condition shown in FIGS. 9–11, the blocking portions 88 and 98 of the retaining legs 80 and 90, respectively, are in a blocking position (FIG. 10). The legs 80 and 90 are blocked from inward movement by the stop 180, and are blocked from outward movement by the edges 42 and 44 of the opening 40. As a result, the retaining legs 80 and 90 are locked in the position shown in FIGS. 10 and 11. In this position, the retaining legs 80 and 90 can not be moved to a position to allow removal of the base 12 from the opening 40. The legs 80 and 90 are blocked from upward movement by the engagement of the blocking surfaces 88 and 98 of the legs against the edges of the opening 40. Therefore, the retaining legs 80 and 90 block removal of the fastener 10 from the opening 40, and the first and second members 20 and 22 are clamped together.

To move the fastener 10 from the first condition to a third or release condition (FIGS. 12–14), the slide 14 is moved farther along the base 12 in the first direction 142. As the slide 14 moves relative to the base 12, the first and second tracks 130 and 150 on the slide move in a direction along the axis 51 relative to the retaining legs 80 and 90 of the base 12, from the position shown in FIG. 11 to the position shown in FIG. 14.

As this movement of the slide 14 occurs, the stop 180 moves away from the first retaining leg 80, and the first track 150 slides along the first retaining leg. The third section 156 and then the fourth section 158 of the first track 150 engage the end portion 86 of the first retaining leg 80. The first retaining leg 80 is cammed inwardly by the third section 156, away from the edges of the opening 40, into engagement with the fourth section 158. The slide 14 moves to a position in which the first retaining leg 80 is located radially inward of the fourth section 158 of the first track. The blocking surface 88 on the retaining leg 80 is moved inwardly of the edge 42 of the opening 40. The slide 14 stops when the pair of detent fingers 67 and 68 on the base 12 engage in the pair of third detent openings 114 in the slide 14.

Simultaneously, the stop 180 on the slide 14 moves away from the second retaining leg 90, and the second track 160 slides along the second retaining leg. The third section 166 and then the fourth section 168 of the second track 160 engage the end portion 96 of the second retaining leg 90. The slide 14 moves to a position in which the second retaining leg 90 is located radially inward of the fourth section 168 of the second track 160. The second retaining leg 90 is cammed inwardly by the third section 166, away from the edges of the opening 40, into engagement with the fourth section 168. The blocking surface 98 on the retaining leg 90 is moved inwardly of the edge 44 of the opening 40.

Figure 12:
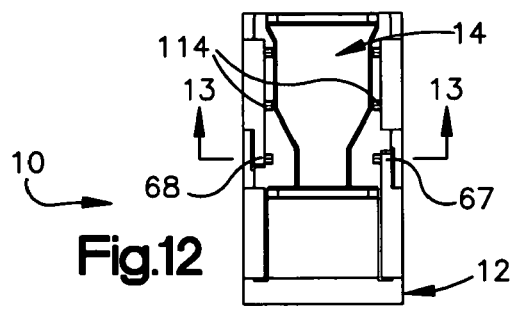
FIG. 12 is a top plan view of the fastener of FIG. 1, similar to FIG. 6, showing the fastener in a third or release condition.
Figure 13:
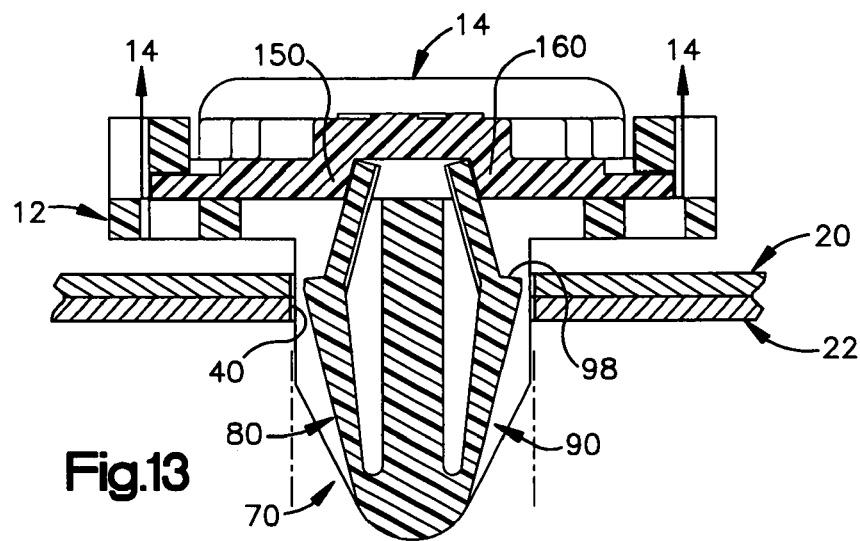
FIG. 13 is a sectional view taken generally along line 13—13 of FIG. 12 showing the parts of the fastener in the third condition.
Figure 14:
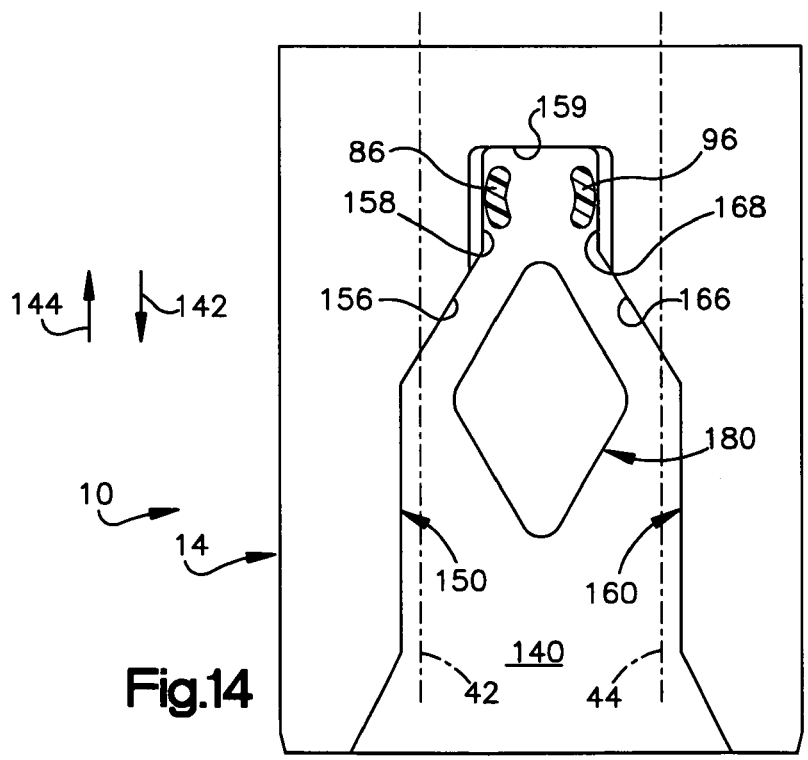
FIG. 14 is a bottom plan view of portions of the fastener of FIG. 1, showing the parts of the fastener in the third condition.

Thus, when the slide 14 is moved relative to the base 12 so as to place the fastener 10 in the third or release condition shown in FIGS. 12–14, the retaining legs 80 and 90 do not block removal of the fastener 10 from the opening 40. The first and second members 20 and 22 are no longer clamped together, and the fastener 10 can be removed from the opening 40.

From the above description of the invention, those skilled in the art will perceive improvements, changes and modifications in the invention. Such improvements, changes and modifications within the skill of the art are intended to be covered by the appended claims.

Having described the invention, I claim:

1. A two part fastener for clamping together first and second members in an overlying relationship, said first and second members having surfaces defining an opening extending through said first and second members, said fastener comprising:

a generally planar base insertable into said opening, said base having a plurality of legs resiliently biased outwardly away from each other and movable between a plurality of positions relative to said first and second members, said legs being insertable through said opening; and an actuator connected with said base and manually slidable along a linear axis parallel to the generally planar base to control the position of said legs of said base relative to said first and second members;

said actuator having a first position of linear sliding movement relative to said base in which blocking portions of said legs are in a blocking position to block removal of said legs through said opening;

said actuator having a second position of linear sliding movement relative to said base in which said actuator blocks inward movement of said blocking portions of said legs from said blocking position, thereby blocking removal of said fastener through said opening; and said actuator having a third position of linear sliding movement relative to said base in which said actuator holds said blocking portions of said legs inward from said blocking position, thereby enabling removal of said fastener from, said first and second members through said opening.

2. A fastener as set forth in claim 1 wherein said actuator is a slide that is moved a predetermined amount in a first direction relative to said base to move said actuator from the first position of sliding movement to the second position of sliding movement, and is moved a predetermined amount relative to said base in said first direction to move said actuator from the second position of sliding movement to the third position of sliding movement.

3. A fastener as set forth in claim 2 wherein said actuator has two tracks for engaging said legs of said base, said first track being engaged with said first leg when said actuator is in the first or second or third positions, said second track being engaged with said second leg when said actuator is in the first or second or third positions.

4. A fastener as set forth in claim 3 wherein said tracks have cam surfaces that cam said legs inwardly toward said axis during movement from the first position to the second position, and said tracks have surfaces that cam said legs inwardly toward said axis during movement from the second position to the third position.

5. A fastener as set forth in claim 1 wherein said actuator has two tracks that move into engagement with and slide along said legs to control the position of said legs in said opening upon linear sliding movement of said actuator relative to said base.

6. A fastener as set forth in claim 5 wherein said tracks define between them a generally V-shaped chamber in which said legs are engageable by said tracks, said V-shaped chamber tapering from an open first end of said actuator to a closed second end of said actuator.

7. A fastener as set forth in claim 5 wherein said actuator includes a stop located between said tracks, said legs having end portions that are captured between said tracks and said stop when said actuator is in the second position.

8. A fastener as set forth in claim 1 wherein said actuator is a slide having opposed, facing surfaces that define between them a V-shaped chamber for receiving end portions of said legs of said base.

9. A fastener as set forth in claim 8 wherein each one of said opposed, facing surfaces has three camming surfaces separated from each other by first and second engagement surfaces, said retaining legs engaging said first engagement surface when said slide is in the first position, said retaining legs engaging said second engagement surface when said slide is in the second position, said retaining legs engaging said a third engagement surface when said slide is in the third position, said third engagement surface being located at the narrow end of said V-shaped chamber.

10. A two part fastener for clamping together first and second members in an overlying relationship, said first and second members having surfaces defining an opening extending through said first and second members, said fastener comprising:

a generally planar base insertable into said opening, said base having a plurality of legs resiliently biased outwardly away from each other and movable between a plurality of positions relative to said first and second members, said legs being insertable through said opening, said plurality of legs on said base including first and second legs each having an end portion and a blocking portion;

an actuator connected with said base and manually slidable relative to said base along a linear axis parallel to the generally planar base to control the position of said legs of said base relative to said first and second members;

said actuator having a first portion comprising a first multi-sectioned track in engagement with said end portion of said first leg to control inward or outward movement of said blocking portion of said first leg in response to sliding movement of said actuator relative to said base in opposite directions;

said actuator having a second portion comprising a second multi-sectioned track in engagement with said end portion of said second leg to control inward or outward movement of said blocking portion of said second leg in response to sliding movement of said actuator relative to said base in opposite directions;

said actuator having a first position of linear sliding movement relative to said base in which said blocking portions of said legs are in a blocking position to block removal of said legs through said opening;

said actuator having a second position of linear sliding movement relative to said base in which said actuator blocks inward and outward movement of said blocking portions of said legs from said blocking position, thereby blocking removal of said fastener through said opening; and said actuator having a third position of linear sliding movement relative to said base in which said actuator holds said blocking portions of said legs inward from said blocking position, thereby enabling removal of said fastener from said first and second members through said opening.

11. A fastener as set forth in claim 10 wherein said tracks define between them a generally V-shaped chamber in which said end portions of said legs are engageable by said tracks, said V-shaped chamber tapering from an open first end of said actuator to a closed second end of said actuator.

12. A fastener as set forth in claim 11 wherein said actuator includes a stop located between said tracks, said leg end portions being captured between said tracks and said stop when said actuator is in the second position.

* * * * *